United States Patent Office 2,853,500
Patented Sept. 23, 1958

2,853,500

PREPARATION OF 1,4-ANDROSTADIEN-3,17 DIONE

Martin Rubin, Silver Spring, Md.

No Drawing. Application August 13, 1956
Serial No. 603,793

6 Claims. (Cl. 260—397.3)

This invention relates to a process for preparing 1,4-androstadien-3,17 dione, and more particularly from isoandrosterone and 4-androsten-3,17 dione.

1,4-androstadien-3,17 dione is an important chemical intermediate in preparation of the sex hormones of the estrogen series. As has been described in U. S. Patent 2,594,349, it can be converted to estrone. The conversion is effected in good yield by subjecting the 1-4-androstadien-3,17 dione in a mineral oil carrier (e. g. decalin) to pyrolysis at about 530° C. Estrone has a wide utility as a female sex hormone. Also it can be readily converted by known methods to other sex hormones such as alpha estradiol, estradiol benzoate. Furthermore, estrone is the starting material for preparation of the class of 19-nor hormones which are finding use in the treatment of many diseases.

A recognized procedure for preparing 1,4-androstadien-3,17 dione involves the dibromination of androstan-3,17 dione to the corresponding 2,4-dibromoandrostan-3,17 dione followed by dehydrobromination to the final 1,4-androstadien-3,17-dione. These two steps have been difficult to carry out with good yields. As a result of this problem the desired compound has been relatively expensive, making the cost of the final product (estrone) also relatively high. A route to the unsaturated androstadien which avoids the troublesome steps of bromination and dehydrobromination would be desirable.

The object of this invention is to provide an improved method of preparing 1,4-androstadien-3,17 dione.

A further object of this invention is to provide a novel compound useful as an intermediate in the production of 1,4-androstadien-3,17 dione.

Further objects and advantages of this invention will be apparent from the description which follows.

As a starting material isoandrosterone is satisfactory; it is readily available from cholesterol, diosgenin or figogenin. The isoandrosterone is converted by known methods to the mixture of 17-cyanohydrin epimers through the addition of hydrogen cyanide. Thus, for example, the isoandrosterone is dissolved with gentle heating and agitation in acetone cyanohydrin. The 17-cyanohydrin epimers form rapidly and can be recovered in a practically quantitative yield (over 90%). The cyanohydrin mixture is oxidized to the mixture of 17-cyanohydrin epimers of androstan-3,17 dione by chromic acid oxidation. This intermediate is then subjected to dehydrogenation by selenious acid or selenium dioxide to the 1,4-diene compound which is then converted to the 1,4-androstadien-3,17 dione by removal of the cyanohydrin blocking group at the 17-ketone position through hydrolysis in alkaline medium. The final product is obtained in excellent yield in pure condition. The reaction sequence pictorially represented below may be so conducted that in practice one may start with the isoandrosterone and without isolation of intermediates end up with the desired final product.

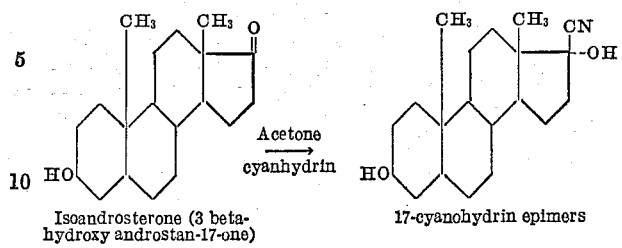

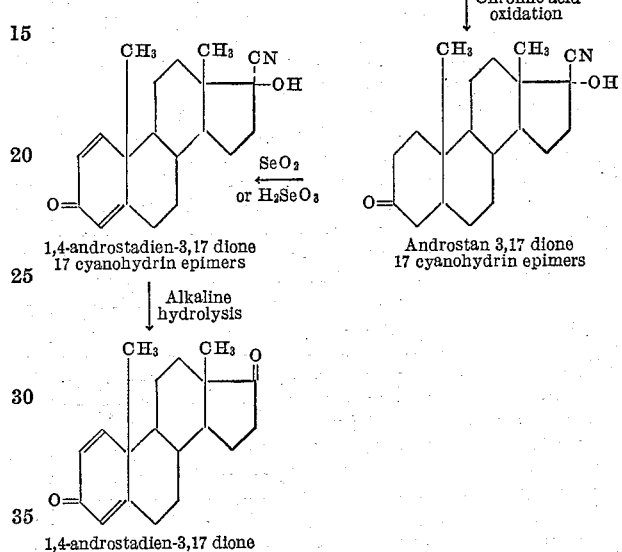

Alternatively and with equal facility one may start with the readily available compound 4-androsten-3,17 dione, convert it to the 17-cyanohydrin dehydrogenate to the 1,4 androstadien-3,17 dione 17 cyanohydrin epimeric mixture and then to the desired compound by removal of the blocking group at the 17 position according to the following pictorial representation.

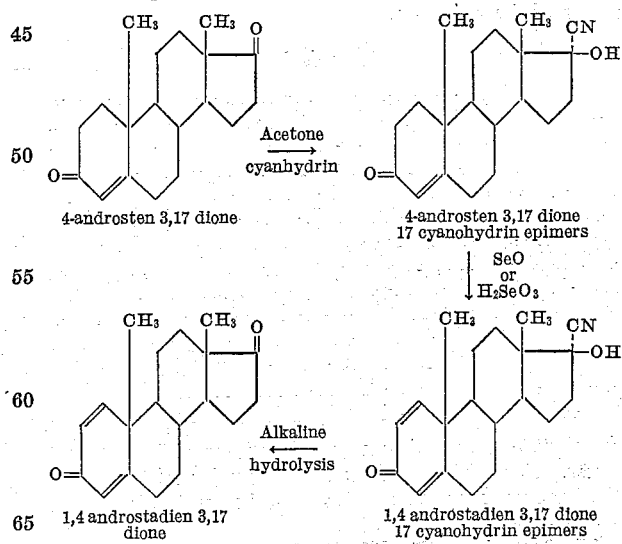

Thus with each starting material, a novel intermediate, the 1,4 androstadien 3,17 dione 17 cyanohydrin is found after the SeO or $H_2SeO_3$ step. The mixture of alpha and beta epimers may be separated out in pure form by dissolving the mixed epimers in ethyl ether followed by concentration to half the solution volume. The alpha epimer separates at this point as a crystalline product. The beta epimer is obtained by evaporating the ethereal mother liquor. Ordinarily, however, the mixed epimers would be used directly to produce 1,4 androstadien 3,17 dione.

As a significant facet of this invention is should be noted that the cyanohydrin blocking group at the 17 position is necessary. Without a blocking group the selenium dioxide or selenious acid oxidizing agent would be able to act on the second center of oxidizability existing in the carbonyl group at the 17 position. However, so long as the 17 position is blocked by the cyanohydrin, selenium dioxide or selenious acid may be used in the fashion described in the literature[1] for the dehydrogenation conversion of 3-ketones to the 1,4 dienone system.

The protection of the 17-carbonyl group by a suitable reagent which will deactivate the 17-carbonyl group, be stable enough to withstand the acid oxidizing conditions, and which will nonetheless be removable with ease at the completion of the reactions is a matter of some difficulty. Other carbonyl blocking groups, for example those of the ethylene glycol ketal or thioketal type, are unsuitable for the present operation. However, the 17 cyanohydrin grouping which forms with ease and is readily removable, does fill the needs of the present objective thus extending selenium dioxide or selenious acid dehydrogenation to the 17-ketones of the steroid family.

The selenium oxidation is preferably carried out in either a mixture of tertiary butyl alcohol and acetic acid or a mixture of benzene and water. The acetic acid and water are used in minor proportions generally not exceeding about 10% of the volume of primary solvent. It is noteworthy that the 17-cyanohydrin of isoandrosterone may initially be dissolved in benzene and subjected successively to chromic acid oxidation, water washing, and selenious acid oxidation while in the benzene solution.

If desired, the chromic acid oxidation can be accomplished using dichromate chromic anhydride or chromic acid in lieu of the sodium dichromate to oxidize the androstan 3 beta-ol-17 one cyanohydrin to the androstan 3,17 dione cyanohydrin. Also, any alkali metal or alkali metal hydroxide dissolved in any of the 1–5 carbon atom aliphatic alcohols can be used in lieu of the KOH ethanol solution for hydrolizing the cyanohydrin to the 1,4 androstadien-3,17-dione. If desired the cyanohydrin may also be hydrolized in aqueous ammonia or alkali metal hydroxide solutions.

Following are detailed examples of preferred embodiments of the invention.

*Example I*

Fifty grams of the mixed 17-epimers of the cyanohydrin of androstan-3-beta-ol-17-one prepared as described by U. S. Patent 2,734,066 and French Patent 1,059,454 dated November 4, 1953, are dissolved in one liter of benzene and is added slowly to a mixture of 68 g. of sodium dichromate, 50 cc. of acetic acid and 90 cc. of concentrated sulfuric acid in 300 ml. of water. The mixture is stirred six hours at 25° C. The benzene layer is separated, washed twice with 100 ml. portions of water and then further oxidized. (If desired, the 17-cyanohydrin alpha and beta epimers of androstan-3,17-dione may be separated out by concentration of the benzene solution followed by crystallization of the residue from ether.)

The benzene solution is then treated with 50 g. of selenious acid, one liter more of benzene and 25 ml. of water. The mixture was held at reflux for twelve hours, the benzene layer separated and washed well with water.

[1] J. Org. Chem., 21, 239 (1956); Helv. Chim. Acta 39, 734 (1956).

The benzene solution was then concentrated to dryness on the steam bath in vacuo and the residue taken up in ethanol. To the ethanol solution was added a solution of 15 g. of potassium hydroxide in 500 ml. of 95% ethanol. The combined solution was warmed gently for 15 minutes, neutralized by the addition of acetic acid, concentrated to dryness in vacuo on the steam pot and the residue treated with 50 ml. cold water and 100 ml. of ethyl ether. The 1,4-androstadien-3,17 dione formed an insoluble crystalline mass at the water-ether interface and is recovered by filtration. The product was washed on the filter with a little cold ether. It had a M. P. of 137–139° C. and was an excellent quality 1,4-androstadien-3,17 dione. The yield was 36 g. of material.

*Example II*

Fifty grams of the mixed 17-epimers of 4-androsten-3,17-dione prepared as described for example in U. S. Patent 2,742,485 are dissolved in two liters of tertiary butyl alcohol and treated with 25 ml. of acetic acid. To this solution was added 20 g. of selenium dioxide. The mixture was refluxed for 18 hours, decanted from the precipitated selenium and concentrated to dryness in vacuo. The residue was taken up in benzene, washed with water, dilute hydrochloric acid solution, cold ammonium sulfide solution, cold ammonia, and water. Concentration of the benzene yielded a gummy product which crystallized on trituration with ether. The crystalline product M. P. 180–192° C. had the correct analysis for 1,4-androstadien-3,17-dione 17 cyanohydrin. The melting point of the product was found to vary somewhat depending on the epimeric composition.

The alpha epimer could be obtained in pure form by dissolving the mixed epimers in ethyl ether followed by concentration to one-half the solution volume. The alpha epimer separated at this point as a crystalline product. The beta epimer was obtained from the ethereal mother liquor. Both compounds gave the correct analytical values for carbon, hydrogen and nitrogen for the cyanohydrin of 1,4-androstadien-3,17 dione.

The mixed epimers were dissolved in ethanol, treated with alcoholic potassium hydroxide as described above in Example I, and worked up to yield 82% of the 1,4 androstadien-3,17 dione.

What is claimed is:

1. The method of preparing 1,4-androstadien-3,17-dione which comprises (a) cyanohydrating androstan 3-beta-ol 17-one by treatment with acetone cyanohydrin; (b) oxidizing the mixed cyanohydrated epimers to androstandione-17-monocyanohydrin by chromic acid oxidation; (c) oxidizing the androstandione-17 monocyanohydrin with a member selected from the group consisting of selenium dioxide and selenious acid to the 17 cyanhydrin of 1,4-androstadien 3,17 dione; and (d) hydrolyzing the cyanohydrin to 1,4-androstadien-3,17 dione.

2. The method of claim 1 wherein the oxidation of step (c) is effected in a mixed solvent selected from the group consisting of tertiary butyl alcohol with acetic acid and benzene with water.

3. The method of claim 1 wherein the steps (a), (b), and (c) are effected in benzene solution without separation and purification of the intermediate reaction products.

4. The method of preparing 1,4-androstadien-3,17-dione which comprises cyanohydrating 4-androsten 3,17 dione by treatment with acetone cyanohydrin, then oxidizing the resulting 17 monocyanohydrin of 4 androsten 3,17 dione with a member selected from the group consisting of selenium dioxide and selenious acid to the 17 cyanohydrin of 1,4 androstadien 3,17 dione and thereafter hydrolyzing the cyanohydrin to 1,4-androstadien-3,17 dione.

5. The method of claim 4 wherein the process is effected without separation and purification of the intermediate reaction products.

6. A compound selected from the group consisting of 1,4-androstadien-3,17 dione 17 cyanohydrin alpha epimer; 1,4-androstadien 3,17 dione 17 cyanohydrin beta epimer, and mixtures thereof.

References Cited in the file of this patent

UNITED STATES PATENTS

| | | |
|---|---|---|
| 2,734,066 | Ercoli et al. | Feb. 7, 1956 |
| 2,742,485 | Ercoli et al. | Apr. 17, 1956 |

OTHER REFERENCES

Fieser and Fieser: Natural Products Related to Phenanthrene, 3rd ed., 1949, Reinhold Publ. Corp., pp. 238–9.

Meystre et al.: Helv. Chim. Acta, vol. 39, pp. 734–742 (February 9, 1956).

Ringold et al.: J. Org. Chem. 21, pp. 239–240 (February 1956).

Wagner-Zook: Synthetic Org. Chem., pp. 604–5 (John Wiley and Sons, New York, 1954).